Oct. 12, 1965 V. TÖRÖK 3,211,985
MEANS FOR CONTROLLING A CONVERTER
Filed Dec. 21, 1961
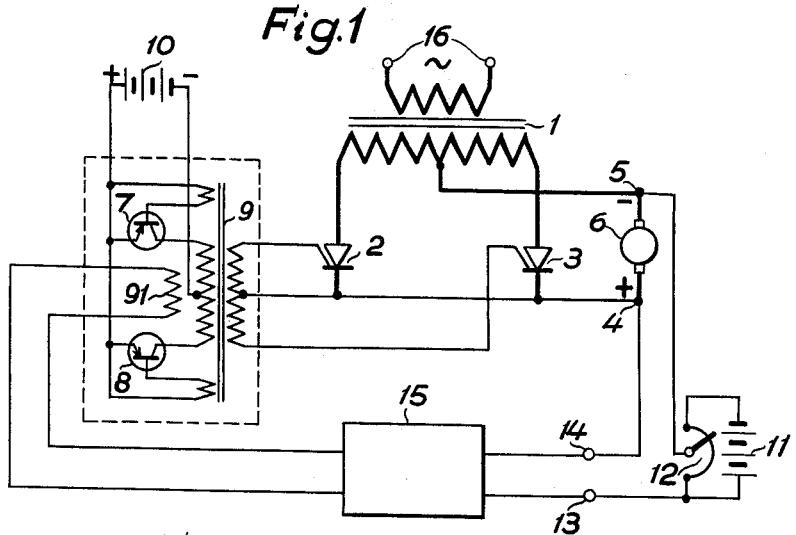
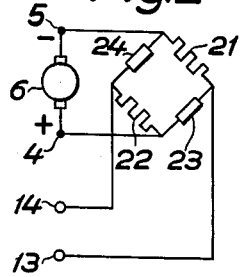
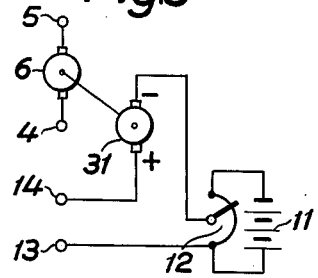
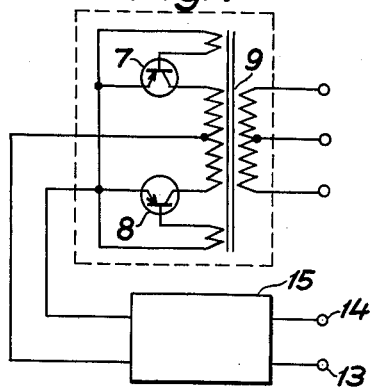
VILMOS TÖRÖK INVENTOR.
BY
Bailey, Stephens & Huettig
ATTORNEYS

United States Patent Office 3,211,985
Patented Oct. 12, 1965

3,211,985
MEANS FOR CONTROLLING A CONVERTER
Vilmos Török, Vasteras, Sweden, assignor to Allmanna Svenska Elektriska Aktiebolaget, Vasteras, Sweden, a corporation of Sweden
Filed Dec. 21, 1961, Ser. No. 161,007
Claims priority, application Sweden, Dec. 31, 1960, 12,728/60
3 Claims. (Cl. 321—18)

The present invention relates to a means for controlling a converter for regulating a magnitude dependent upon the phase angle of the converter.

Static converters, consisting of for example ionic valves, thyratron valves or controllable semi-conductor valves, are normally controlled by supplying to the ignition electrodes and grids respectively of the valves forming the converter, periodic ignition impulses which are synchronous with the alternating voltage to which the converter is connected. By phase-displacing these ignition impulses in relation to the alternating voltage, it is possible to control the converter between its two end positions, i.e. between the highest possible direct voltage when rectifying and the highest possible direct voltage in the opposite direction when converting to A.C. Such a converter may be used for many purposes, for example for feeding a direct current motor. In most cases, some form of automatic regulation is desirable, for example so that the voltage or current of the converter or the speed of the motor connected to it, is kept constant at a certain desired value. It is thus known to use a control impulse generator which gives control impulses of a constant frequency synchronous with the alternating voltage feeding the converter, but being phase-displaced in relation to the alternating voltage, which may be influenced by an electrical magnitude derived from the difference between the magnitude to be regulated and its desired value. These earlier known means for generating control impulses are, however, impaired by certain drawbacks, such as the fact that they are relatively expensive and complicated, that they permit only a limited variation of the phase-angle of the converter, and that they give a regulating accuracy which is sometimes insufficient.

The object of the present invention is to effect a means for controlling converters which is not impaired by the above mentioned drawbacks. The means according to the invention is characterised in that the control impulse generator of the converter and/or the alternating current source feeding the converter consist of an oscillator having controllable frequency and being provided with a member for controlling the frequency of the oscillator dependent upon the discrepancies between the actual value and the desired value of the controlled magnitude. As will be clear from the following, in comparison with earlier known means for generating control impulses, the invention provides a simpler and cheaper construction, greater regulating accuracy and an increased phase angle area available for use.

The invention will be explained more closely in the following with reference to FIGURES 1–4. FIGURE 1 shows an embodiment of the invention for regulating a direct voltage across a load object fed by a converter, whereby the control impulse feeding means consists of an oscillator with controllable frequency. FIGURE 2 shows a modification of the same connection, but having a different device for deriving the discrepancy of the controlled direct voltage from its desired value. FIGURE 3 shows a modification of the device according to FIGURE 1 for regulating the speed of a direct current motor fed by a converter. FIGURE 4 shows, as an example, another method of controlling the oscillator generating the control impulses.

FIGURE 1 shows by way of example a single-phase converter comprising a transformer 1, this being connected by means of the terminals 16 between an alternating current network feeding the converter, and valves 2 and 3 which are shown, by way of example, as controllable semi-conductor valves, so-called thyristors. The direct current poles 4 and 5 of the converter are connected to a load object which, in the shown example, consists of a direct current motor 6. The control impulses are generated by a self-oscillating oscillator which, in the shown example, consists of the transistors 7 and 8, which are connected in an oscillator connection known per se, to the transformer 9, and which are fed from a direct voltage source 10. The frequency of the oscillator may be varied by exciting the transformer 9 to a varying degree by means of direct current in the winding 91.

The direct voltage between the poles 4 and 5 obtained from the converter is comparable to a reference voltage which, for example, is obtained from a battery 11 and can be set by means of a potentiometer 12. In this way a voltage is obtained between the connection points 13 and 14, which voltage forms the difference between the direct voltage and the reference voltage of the converter. This difference voltage may be connected directly or via an amplifier 15 to the control winding 91.

The oscillator is suitably dimensioned so that its frequency, when no current flows in the control winding 91, is somewhat less than the frequency of the alternating current network connected to the converter. When a direct current flows in the control winding 91, the frequency will increase and, at a certain value of this current, the oscillator will operate synchronously with the frequency of the alternating current network. This current value is maintained at a predetermined very small digression between the direct voltage across the terminals 4 and 5 and the reference voltage set by the potentiometer 12. In this position it is possible to use the transistor oscillator as control impulse generator for the converter connected to the alternating current network. If, for some reason, the voltage of the converter should sink, a voltage difference is obtained between the points 13 and 14 in such a direction that the current in the control winding 91 increases and the frequency of the oscillator increases. Thus the ignition impulses will occur successively earlier and earlier, and the direct voltage produced by the converter will therefore increase. When the voltage has increased so much that the desired value has again been reached, the voltage between 13 and 14 decreases again to that value which allows synchronous operation. Thus by momentarily increasing the frequency of the oscillator the position of the control impulses has been phase-displaced to take place earlier. In the same way a short drop in frequency occurs if the direct voltage should become too high, so that the control impulses are phase-displaced to a later position which gives less direct current. In this way, by momentary action through the control winding 91, the oscillator will momentarily digress from the synchronous frequency, but not more than to keep the control impulses within the phase angles in relation to the alternating voltage feeding the converter, which gives the desired control. By suitably limiting to a predetermined maximum value the digression from the synchronous frequency of the oscillator at regulating action, it is also possible, if desired, to limit the speed with which the alteration of the phase angle shall take place. After a regulating action the frequency of the oscillator returns automatically to synchronization with the alternating current network, and the voltage between 13 and 14 thus returns to exactly its normal value. Theoretically, this should mean a permanent regulating accuracy which, however, for various practical reasons, is impossible to completely attain. However, one of the most important stipulations for very high regulating accuracy has been complied with by means of the invention.

With the embodiment of the invention shown in FIGURE 1, the required control voltage is obtained between the terminal points 13 and 14 by a subtraction of the regulated direct voltage between the terminal points 4 and 5 and a reference voltage from the potentiometer 12. In FIGURE 2 is shown an alternative arrangement. Instead, a bridge connection is connected to the points 4 and 5, consisting of two ohmic resistances 21 and 22 and two resistances 23 and 24 having a non-linear relationship between current and voltage, so-called non-linear resistances. The two remaining corner points of this bridge are connected to the points 13 and 14, between which is obtained the control voltage. A bridge of this type consisting of two ohmic and two non-linear resistances is balanced at a certain value of supply voltage, at which the apparent resistance of the voltage dependent resistances is equal to that of the ohmic resistances 21 and 22. If the supplied direct voltage digresses from this value, a direct voltage is obtained between the two other corner points, whose sign depends upon whether the direct voltage is greater than or less than the value which gives balance. In this way a control voltage is obtained which is dependent upon the digression of the direct voltage from the desired value, which is that value when the bridge is balanced.

In the embodiments of the invention shown hitherto, the magnitude to be regulated has been the direct voltage across the connected load object. The magnitude to be regulated may, however, be any magnitude which can be influenced by controlling the converter, for example speed of rotation, acceleration or load curent of a direct current motor connected thereto. FIGURE 3 shows by way of example, the case when the speed of the direct current motor 6, connected between the terminal points 4 and 5 on the converter, is to be regulated. In this case, a tachometer generator 31 is suitably situated on the shaft of the direct current motor, the voltage of which represents the speed of rotation. From this voltage is then subtracted the voltage set by the potentiometer 12, and between the terminal points 13 and 14 a control voltage is obtained which represents the deviation of the speed of rotation from the desired value.

In FIGURE 1 an oscillator is shown by way of example for generating control impulses, controlled by means of a control winding 91. FIGURE 4 shows another control alternative, in which case the control winding 91 is missing. Instead, the oscillator obtains its power from the control voltage. This may occur directly or through the amplifier 15. In an oscillator of the shown type the frequency will be directly proportional to the direct voltage supplied, which in this way is utilized for a simple frequency control.

In the shown embodiments of the invention it is a question of controlling a single-phase converter, and a single-phase oscillator is thus used. Of course, the invention may be adapted for controlling multi-phase converters and in this case multi-phase oscillators may be used. A multi-phase oscillator connection suitable for this purpose may, for example, be of that type in which the frequency is determined by the supply direct voltage of the oscillator.

Further, only transistor oscillators have been shown by way of example, but it is obvious that the invention is not limited to this type of oscillator, but most types of oscillators having controllable frequencies may be used within the scope of the invention. Thus, for example, any of the different known types of electronic valve oscillators may be used, the frequency of which can be influenced electrically by some known method, for example for frequency modulation. An oscillator may even be influenced purely mechanically, which is particularly advantageous when the magnitude to be regulated is a mechanical one.

Neither, of course, is the invention only adaptable for converters having semi-conductor valves such as thyristors and transistors, but may also be used for converters having other types of controllable valves, for example ionic valves or thyratrons.

As an example of the adaptation of the invention, only the feeding of a direct current motor has been shown. It is obvious, however, that the invention can be adapted in all cases when the phase angle of controllable valves can be utilized for controlling a voltage or current. One important field of use of this type is for the excitation of rotating electrical machines for regulating for example, the voltage or rate of revolution.

A converter according to the invention can even be made as an amplifier for arbitrary use and in this case the reference voltage which may be set by the potentiometer 12 in FIGURE 1, is replaced by a voltage acting as input magnitude for the amplifier. If a particularly short reaction time for the amplifier is desired the converter may suitably be fed from an oscillator having a higher frequency than a normal alternating current network.

In the shown embodiments of the invention it is finally only the control impulse generator of the converter which consists of an oscillator having a frequency which is controlled dependent upon the digression of the regulated magnitude from the desired value. It is, however, obvious that exactly the same function is obtained if the converter is fed from an oscillator having controllable frequency, which is connected to the terminals 16 in FIGURE 1 and whose frequency is controlled dependent upon the digression of the regulated magnitude from the desired value in the same way as described for the control impulse generator. With such an embodiment of the invention, the frequency of the control impulse generator may either be constant or controlled simultaneously with the frequency of the feeding source.

I claim:

1. An electrical converter comprising an alternating current supply means, controllable current elements connected to said supply means and a control pulse generator means connected to the control electrodes of said controllable current elements, at least one of said means comprising a free-running oscillator, said oscillator having a frequency control circuit, a control signal generating means having its output terminals connected to the input terminals of said frequency control circuit and operatively connected to the converter to sense the output magnitude of the converter and generate a signal dependent upon the difference between the actual value of said output magnitude and its desired value, whereby the frequency of the oscillator is controlled so as to change the phase shift between the alternating current supply means and the control pulse generator means in such a sense that the difference between the actual and the desired values of said output magnitude is decreased.

2. An electrical converter as claimed in claim 1, said control signal generating means including means responsive to the difference between a reference voltage and a voltage proportional to the value of the output magnitude.

3. An electrical converter as claimed in claim 2, in which said difference responsive means comprises a bridge comprising ohmic resistances and non-linear resistances, and means to feed to said bridge a voltage proportional to the value of the output magnitude of the converter, the output voltage of the bridge being zero when said output magnitude of the converter has its desired value.

References Cited by the Examiner
UNITED STATES PATENTS

| | | | |
|---|---|---|---|
| 3,047,789 | 7/62 | Lowry | 321—18 |
| 3,114,097 | 12/63 | Clarke | 323—22 |
| 3,128,422 | 4/64 | Brown | 321—47 X |

LLOYD McCOLLUM, *Primary Examiner.*